(12) United States Patent
Liao (10) Patent No.: US 7,909,281 B2
(45) Date of Patent: Mar. 22, 2011

(54) WIRE-WINDING DEVICE HAVING A CIRCUIT UNIT

(76) Inventor: Sheng-Hsin Liao, Shulin (TW)

( * ) Notice: Subject to any disclaimer, the term of this patent is extended or adjusted under 35 U.S.C. 154(b) by 261 days.

(21) Appl. No.: 12/071,111

(22) Filed: Feb. 15, 2008

(65) Prior Publication Data

US 2009/0206189 A1 Aug. 20, 2009

(51) Int. Cl.
*B65H 75/48* (2006.01)
(52) U.S. Cl. .................................. 242/378.1; 242/385.1
(58) Field of Classification Search .................. 242/378, 242/378.1, 378.2, 378.3, 378.4, 385, 385.4, 242/388, 388.1; 191/12 R, 12.2 R, 12.4; 439/501
See application file for complete search history.

(56) References Cited

U.S. PATENT DOCUMENTS

| | | | | |
|---|---|---|---|---|
| 3,619,518 A * | 11/1971 | Blanch et al. | ............ | 191/12.2 R |
| 3,808,382 A * | 4/1974 | Blanch et al. | ............ | 191/12.2 R |
| 3,854,017 A * | 12/1974 | Crim | ......................... | 191/12.2 R |
| 4,300,665 A * | 11/1981 | Arechaga | ..................... | 191/12.4 |
| 6,199,674 B1 * | 3/2001 | Liao | ............................ | 191/12.4 |
| 6,315,231 B1 * | 11/2001 | Liaom | ........................ | 242/378.1 |
| 6,416,355 B1 | 7/2002 | Liao | | |
| 6,808,138 B2 | 10/2004 | Liao | | |
| 6,866,219 B2 * | 3/2005 | Wei | ............................ | 242/378.4 |
| 7,364,109 B2 * | 4/2008 | Kuo | ............................ | 242/378.1 |
| 2004/0094649 A1 * | 5/2004 | Park | ............................ | 242/378.1 |
| 2006/0011763 A1 * | 1/2006 | Kuo | ............................ | 242/378.1 |
| 2007/0001046 A1 * | 1/2007 | Wu | ............................. | 242/378.1 |

* cited by examiner

*Primary Examiner* — William A Rivera
(74) *Attorney, Agent, or Firm* — Rosenberg, Klein & Lee (57) ABSTRACT

A wire-winding device includes a circuit unit, a wire-winding disk, two cables, a scroll spring and a circuit unit. The insulating body has receiving space. The wire-winding disk is rotatably located in the receiving space. The wire-winding disk has at least one concave slot. There is a rolling ball between the concave slot and the insulating body. The scroll spring is connected between the wire-winding disk and the insulating body. The circuit unit is located in the wire-winding disk and is electrically connected with the two cables. Thereby, the user can rapidly receive or lease the cable to adjust the length of the cable, and use the circuit unit to convert the input voltage or current into a desired voltage or current for outputting.

13 Claims, 9 Drawing Sheets

WIRE-WINDING DEVICE HAVING A CIRCUIT UNIT

BACKGROUND OF THE INVENTION

1. Field of the Invention

The present invention relates to a wire-winding device having a circuit unit. In particular, this invention relates to a wire-winding device having a circuit unit that can adjust the length of the cable and convert the voltage and current.

2. Description of the Related Art

The computers, the printers, or the communication devices (such as telephones or fax machines) are connected by a cable to transmit the electric signals or the data. However, a cable is too long so that the cable will be intertwisted or the cable is too short is a problem for the user. Therefore, a variety of wire-winding devices are developed, such as the wire-winding devices disclosed in U.S. Pat. No. 6,416,355 and 6,808138. The wire-winding device of the prior art includes a body, a cable, a wire-winding disk and a volute spring. The plug of the cable is plugged into the socket of the communication devices to transmit the data, and the length of the cable can be adjusted.

However, the wire-winding boxes or the wire-winding devices of the prior art merely have the wire-winding function and the signal-transmitting function. They cannot convert the voltage or the current. Furthermore, when the cable is wound onto the wire-winding device, the winding disk often touches the housing, so that the occurring friction affects the wire-winding speed, causing inconvenience.

SUMMARY OF THE INVENTION

One particular aspect of the present invention is to provide a wire-winding device having a circuit unit. The user can rapidly receive and release the cable to adjust the length of the cable, and uses the circuit unit to convert the input voltage or current to the desired voltage or current to output.

The wire-winding device having a circuit unit includes an insulating body having a receiving space, a wire-winding disk rotatably received in the receiving space, the receiving space being composed of a first receiving cavity and a second receiving cavity, two cables wound around the wire-winding disk, a scroll spring located in the first receiving cavity, and a circuit unit located in the second receiving cavity. The inner wall of the insulating body has at least one groove. There are at least two concave slots on the wire-winding disk that correspond to the groove. There are at least two rolling balls received between the two concave slots and the groove. The scroll spring is connected between the wire-winding disk and the insulating body. The circuit unit is electrically connected with the cable.

The present invention has the following characteristics. Because the wire-winding disk is rotatably received in the receiving space of the insulating body, and at least two rolling balls are received between the two concave slots and the groove, the user can rapidly receive or lease the cable to adjust the length of the cable. It is convenient for the user to receive the cable or carry the wire-winding device. Moreover, because the circuit unit is located in the second receiving cavity of the wire-winding disk and the circuit unit is electrically connected with the cable, the user can use the circuit unit to convert the input voltage or current into a desired voltage or current to output.

For further understanding of the invention, reference is made to the following detailed description illustrating the embodiments and examples of the invention. The description is only for illustrating the invention and is not intended to limit of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
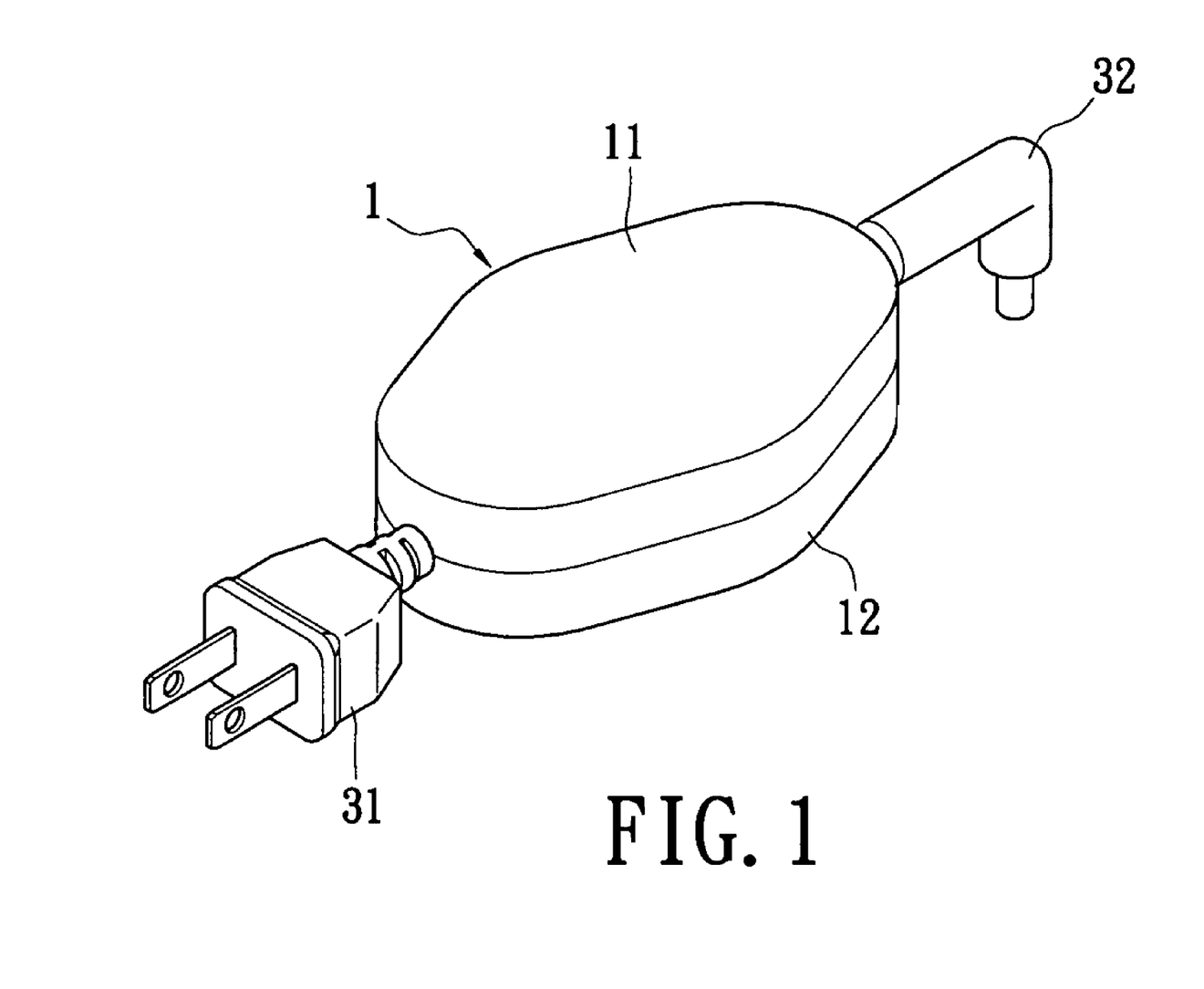
FIG. 1 is a perspective view of the wire-winding device having a circuit unit of the first embodiment of the present invention.
Figure 2:
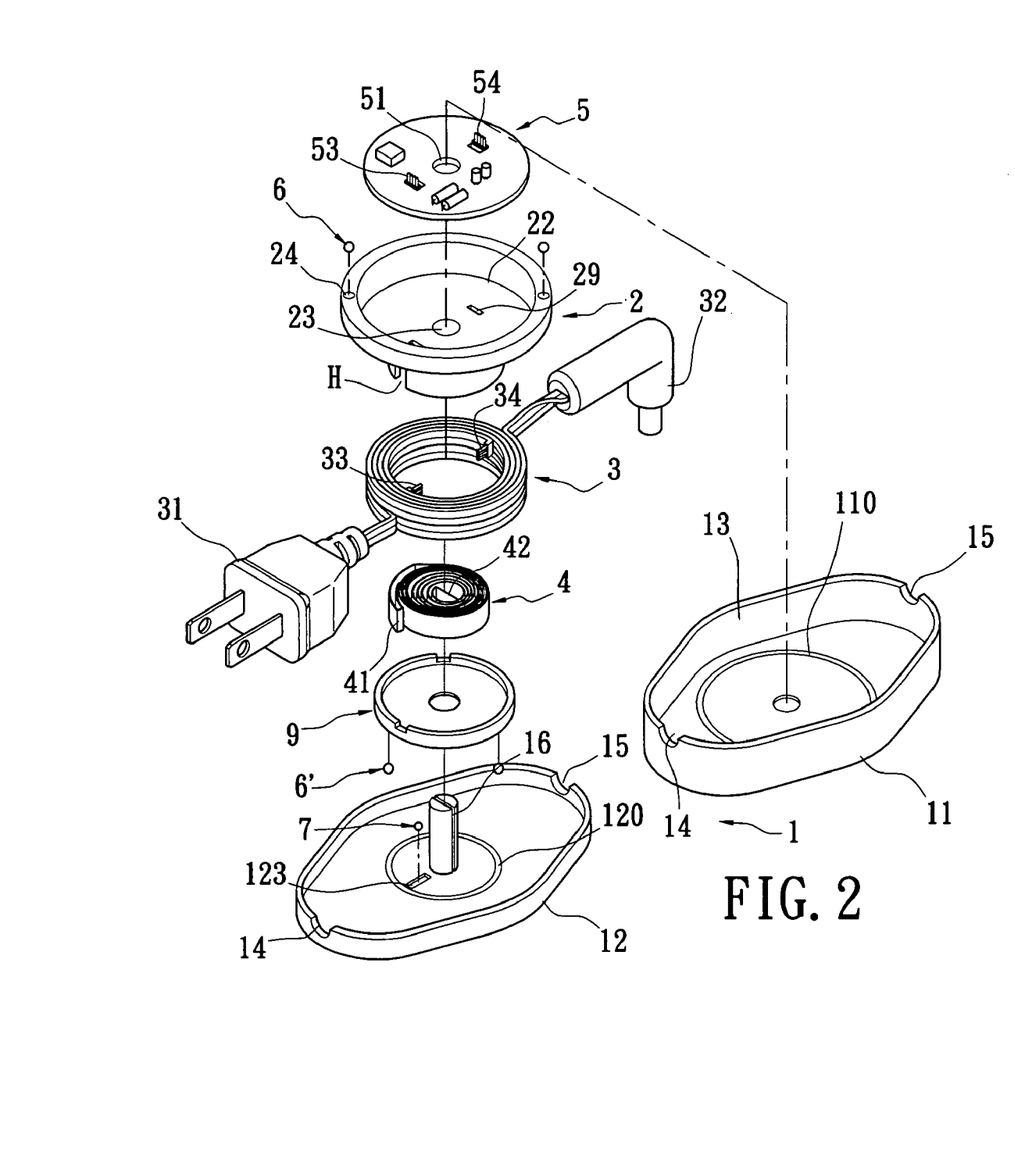
FIG. 2 is an exploded perspective view of the wire-winding device having a circuit unit of the first embodiment of the present invention.
Figure 2A:
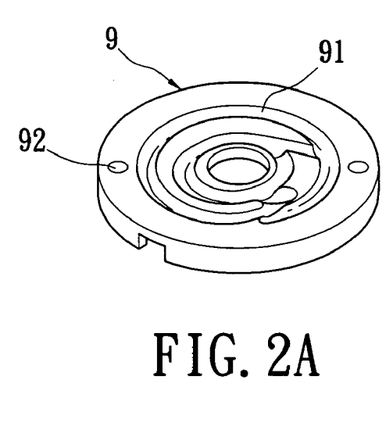
FIG. 2A is a perspective view of the disk body of the wire-winding device having a circuit unit of the first embodiment of the present invention.
Figure 3:
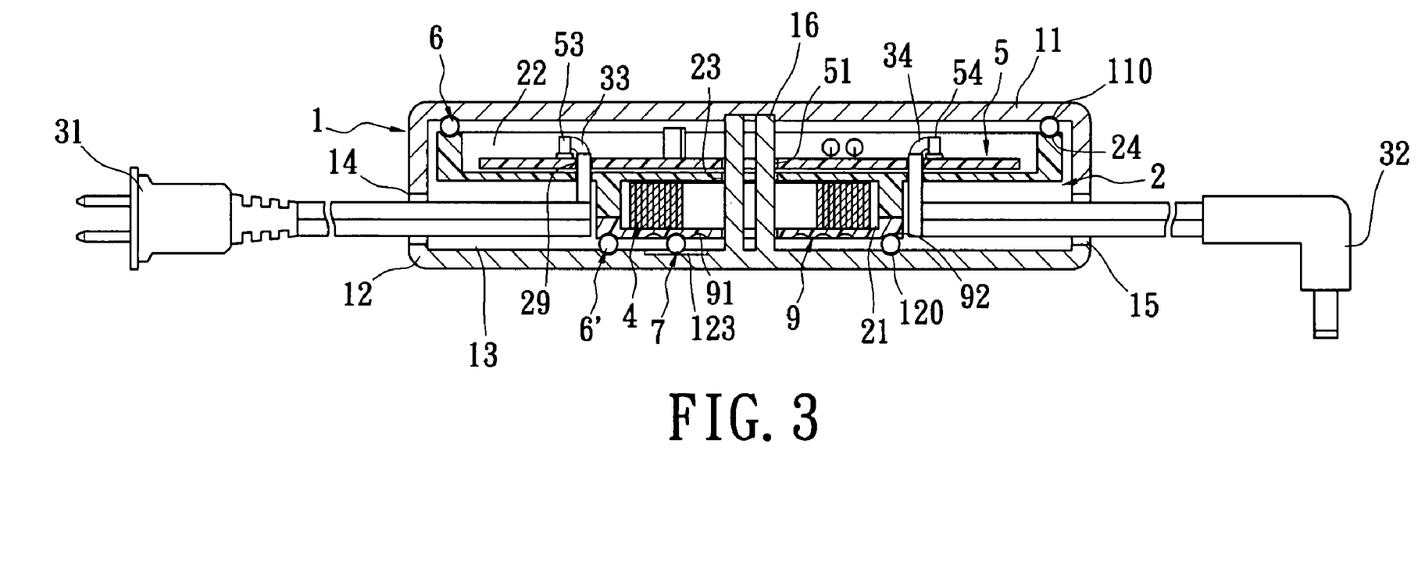
FIG. 3 is a cross-sectional view of the wire-winding device having a circuit unit of the first embodiment of the present invention.

Reference is made to FIGS. 1~3. The wire-winding device having a circuit unit includes an insulating body 1, a wire-winding disk 2, two cables 3, a scroll spring 4, a circuit unit 5 and a disk body 9. The insulating body 1 has a first shell 11 and a second shell 12. The first shell 11 and the second shell 12 are assembled into one piece by a screwing method or a wedging method to form a hollow insulating body 1. There is a receiving space 13 in the insulating body 1 for receiving the wire-winding disk 2, the two cables 3 and the scroll spring 4. At the side of the insulating body 1, there are a first cable hole 14 and a second cable hole 15. One end of the two cables 3 respectively extends to outside from the first cable hole 14 and the second cable hole 15. At the center of the inner wall of the second shell 12, there is a shaft 16, and the shaft 16 extends into the receiving space 13. In this embodiment, the inner walls of the first shell 11 and the second shell 12 respectively have a groove 110 and a groove 120. There is a moving slot 123 between the shaft 16 and the groove 120.

The wire-winding disk 2 is received in the receiving space 13 of the insulating body 1. In this embodiment, the wire-winding disk 2 is manufactured into one piece. The wire-winding disk 2 has a first receiving cavity 21 and a second receiving cavity 22. There is a shaft hole 23 on the center of the wire-winding disk 2. The wire-winding disk 2 is movably fixed to the shaft 16 of the insulating body 1 via the shaft hole 23 so that the wire-winding disk 2 rotates in the receiving space 13. There are two concave slots 24 on the wire-winding disk 2 that correspond to the groove 110 of the first shell 11. The quantity of the concave slots 24 is not limited to two. Two rolling balls 6 are received between the groove 110 and the two concave slots 24. By utilizing the two rolling balls 6, the wire-winding disk 2 is easily rotated with the insulating body 1.

The two cables 3 are the wires having conducting bodies for transmitting the electrical power or signals. In this embodiment, the two cables 3 are power cables. The two cables 3 are wound around the wire-winding disk 2, and one end of each of the two cables 3 respectively extends to outside via the first cable hole 14 and the second cable hole 15 of the insulating body 1 and is assembled with the electrical connectors 31,32. The electrical connectors 31, 32 respectively are a power plug and a DC plug. The electrical connectors 31, 32 also can be other connectors, such as USB, IEEE1394, RJ45 or RJ11 connectors, or be replaced by a phone jack or a microphone. The second end of each of the two cables 3 respectively has a first connection terminal 33 and a second connection terminal 34. The first connection terminal 33 and the second connection terminal 34 are conductors. The wire-winding disk 2 has two through holes 29 that respectively correspond to the first connection terminal 33 and the second connection terminal 34.

The shape of the scroll spring 4 is volute. The scroll spring 4 is located in the first receiving cavity 21 of the wire-winding disk 2. The two ends of the scroll spring 4 respectively have a first wedging terminal 41 and a second wedging terminal 42. The first wedging terminal 41 is wedged to the wedging slot H of the wire-winding disk 2 and the disk body 9. The second wedging terminal 42 is wedged to the shaft 16 of the insulating body 1 so that the scroll spring 4 is connected between wire-winding disk 2 and the insulating body 1 to provide a recovery force to the wire-winding disk 2.

The circuit unit 5 is located in the second receiving cavity 22 of the wire-winding disk 2. In this embodiment, the circuit unit 5 is a rectification transformer circuit unit and can change the magnitude of the input voltage and convert the AC power into the DC power. The center of the circuit unit 5 has a through hole 51. The through hole 51 can be plugged by the shaft 16 of the insulating body 1. The circuit unit 5 has two connection portions 53, 54. The first connection terminal 33 and the second connection terminal 34 respectively pass through the two through holes 29 and the circuit unit 5, and are welded to the two connection portions 53, 54 so that the two cables 3 are electrically connected with the circuit unit 5. Furthermore, there are pins (not shown in the figure) located between the circuit unit 5 and the two cables 3 to connect the two connection portions 53, 54 with the first connection terminal 33 and the second connection terminal 34.

The disk body 9 is rotatably located below the scroll spring 4. The disk body 9 has a track slot 91 and two concave slots 92. The track slot 91 and the two concave slots 92 respectively correspond to the moving slot 123 and the groove 120. A ball 7 is received between the track slot 91 and the moving slot 123. By utilizing the relative movements between the ball 7, the track slot 91 and the moving slot 123, the two cables 3 can be fastened, received, or released by using the repeated receiving and releasing operations. The user will not be affected by the recovery force. Two rolling balls 6' are respectively received between the two concave slots 92 and the groove 120 so that the wire-winding disk 2 can be easily rotated with the insulating body 1.

Figure 4:
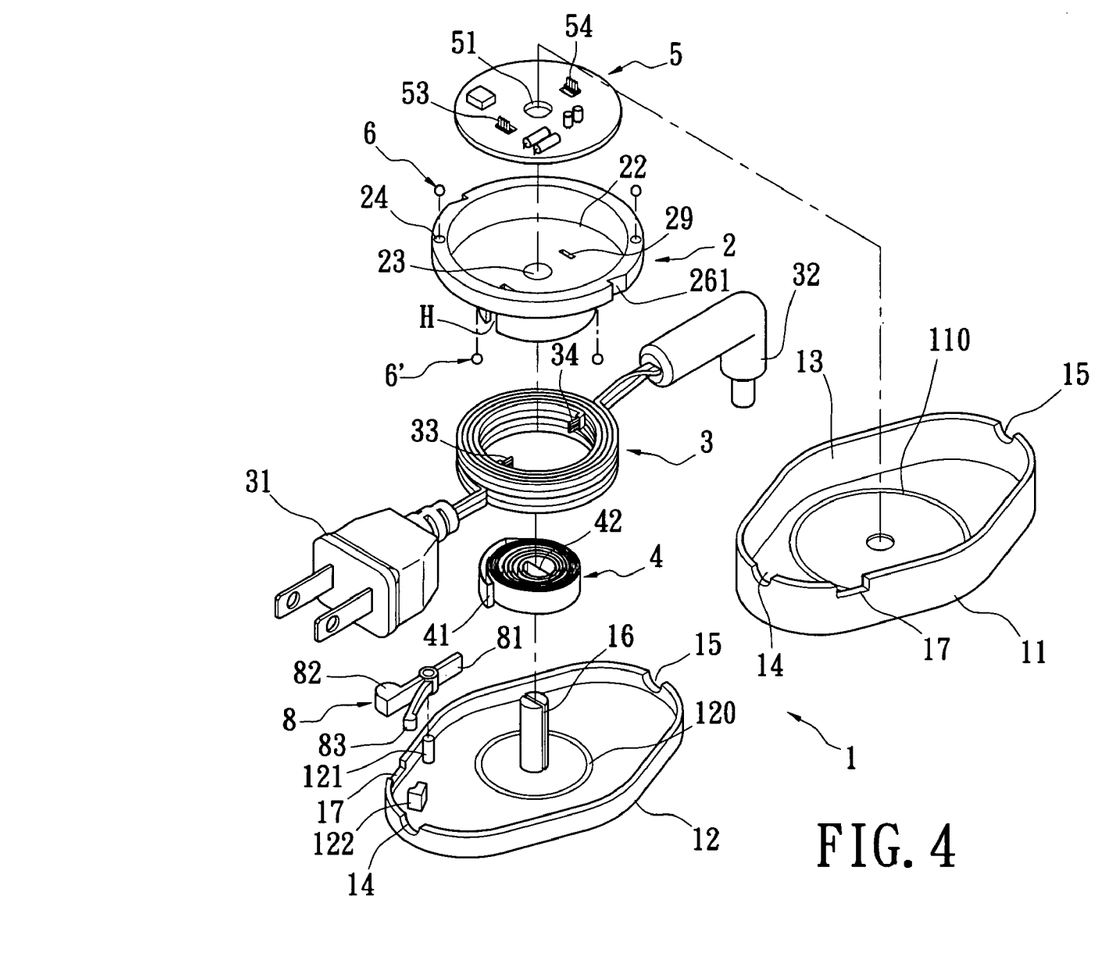
FIG. 4 is an exploded perspective view of the wire-winding device having a circuit unit of the second embodiment of the present invention.

Reference is made to FIG. 4, which shows an exploded perspective view of the wire-winding device having a circuit unit of the second embodiment of the present invention. The difference between the second embodiment and the first embodiment (as shown in FIG. 2) is described as followings. The side of the insulating body 1 has a press-button hole 17. The edge of the wire-winding disk 2 has two opening slots 261. The inner wall of the second shell 12 that is near to the press-button hole 17 has a convex rib 121 and a convex block 122. The convex rib 121 is sleeved with a braking part 8. The braking part 8 is used for replacing the disk body 9 and has a blocking portion 81, a press-button 82 and a pushing portion 83. The blocking portion 81 is blocked to the two opening slots 261. The press-button 82 extends to outside of the press-button hole 17. The pushing portion 83 is flexible and contacts the convex block 122. By pressing the press-button 82 of the braking part 8, the blocking portion 81 is separated from the opening slots 261 so that the two cables 3 are received due to the recovery force of the scroll spring 4 when the user pulls and releases the cables 3.

Figure 5:
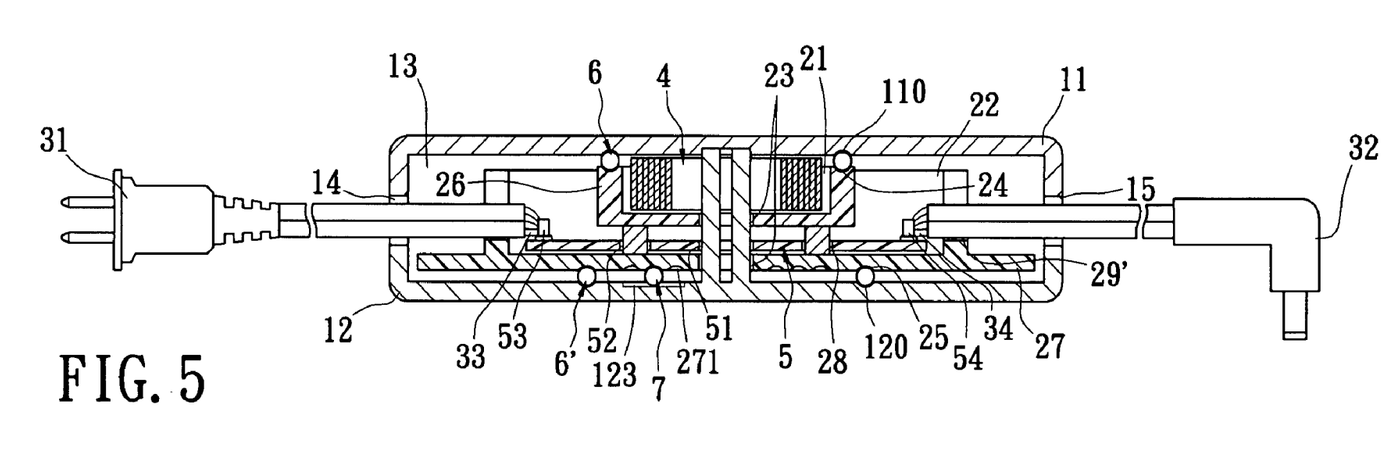
FIG. 5 is a cross-sectional view of the wire-winding device having a circuit unit of the third embodiment of the present invention.

Reference is made to FIG. 5, which shows a cross-sectional view of the wire-winding device having a circuit unit of the third embodiment of the present invention. The difference between the third embodiment and the first embodiment (as shown in FIG. 2) is described as followings. The wire-winding disk 2 has a first rotation body 26 and a second rotation body 27. The first receiving cavity 21 is located in the first rotation body 26, and the second receiving cavity 22 is located in the second rotation body 27. The first rotation body 26 is assembled onto the second rotation body 27 via two frames 28. The two frames 28 extend downwards from the bottom of the first rotation body 26, pass through the through hole 52 of the circuit unit 5, and are fastened onto the second rotation body 27. The center of each of the first rotation body 26 and the second rotation body 27 respectively has a shaft hole 23. The first rotation body 26 and the second rotation body 27 are movably fixed to the shaft 16 of the insulating body 1 via the two shaft holes 23. The two cables 3 respectively pass through the two through holes 29' of the second rotation body 27 and are electrically connected with two connection portions 53, 54. The second rotation body 27 has two concave slots 25 and a track slot 271 that correspond to the groove 120 and the moving slot 123 of the second shell 12. Two rolling balls 6' are respectively located between the groove 120 and the two concave slots 25. The ball 7 is located between the moving slot 123 and the track slot 271.

Figure 6:
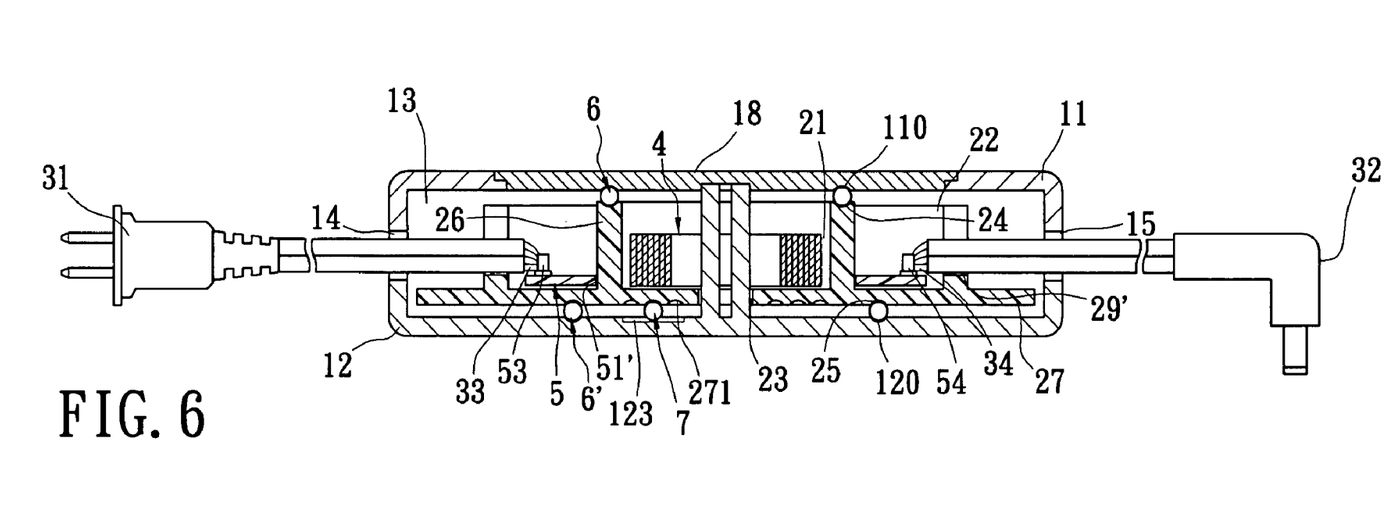
FIG. 6 is a, cross-sectional view of the wire-winding device having a circuit unit of the fourth embodiment of the present invention.

Reference is made to FIG. 6, which shows a cross-sectional view of the wire-winding device having a circuit unit of the fourth embodiment of the present invention. The difference between the fourth embodiment and the third embodiment (as shown in FIG. 5) is described as followings. The first shell 11 has a cover body 18. The first rotation body 26 and the second rotation body 27 are manufactured into one piece. The center of the circuit unit 5 has a second through hole 51'. The diameter of the second through hole 51' is larger than the diameter of the first rotation body 26 so that the circuit unit 5 can be sleeved onto the wire-winding disk 2. The assembling process is easy.

Figure 7:
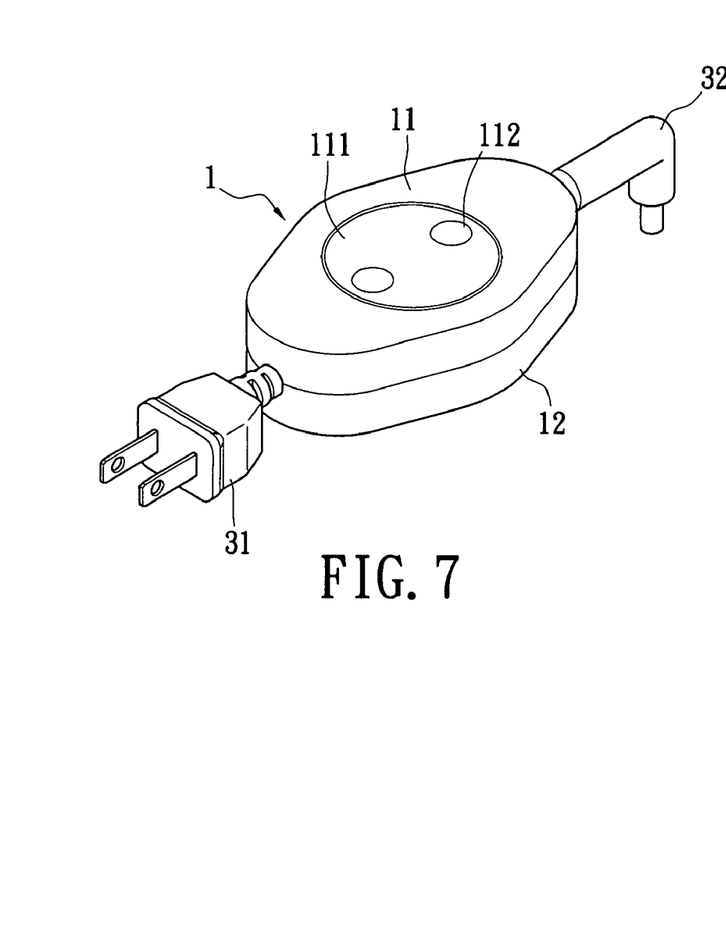
FIG. 7 is a perspective view of the wire-winding device having a circuit unit of the fifth embodiment of the present invention.

Reference is made to FIG. 7, which shows a perspective view of the wire-winding device having a circuit unit of the fifth embodiment of the present invention. The difference between the fifth embodiment and the first embodiment (as shown in FIG. 1) is described as followings. The first shell 11 of the insulating body 1 has a rotation part 111. The rotation part 111 is connected with the wire-winding disk 2. The rotation part 111 has two turning slot 112 so that the user can easily rotate the rotation part 111 to adjust the length of the two cables 3.

Figure 8:
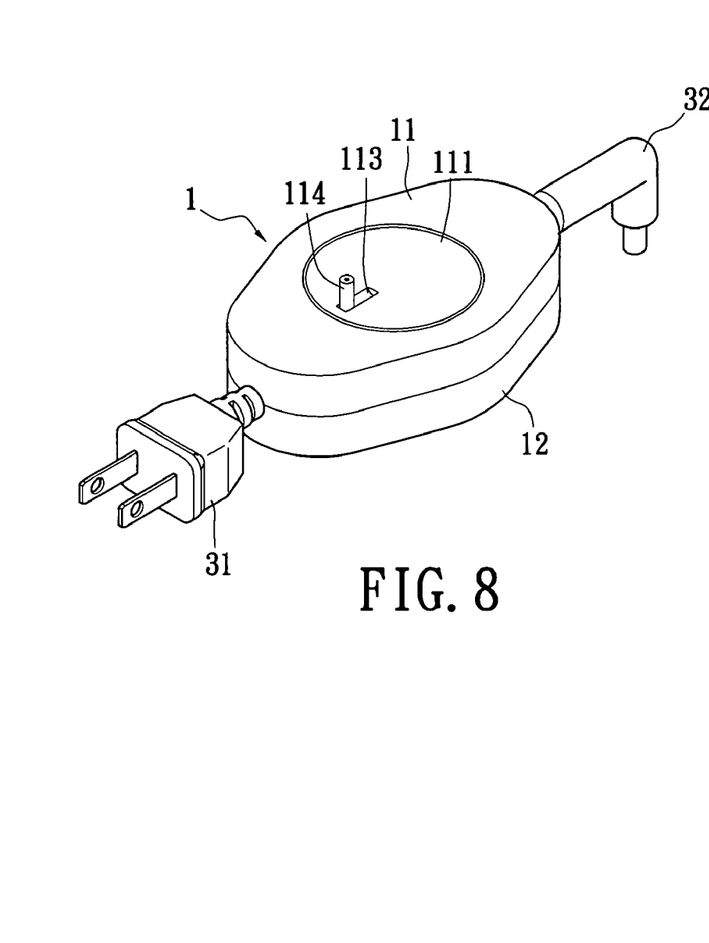
FIG. 8 is a perspective view of the wire-winding device having a circuit unit of the sixth embodiment of the present invention.

Reference is made to FIG. 8, which shows a perspective view of the wire-winding device having a circuit unit of the sixth embodiment of the present invention. The difference between the sixth embodiment and the fifth embodiment (as shown in FIG. 7) is described as followings. The rotation part 111 has a receiving cavity 113, and a turning rod 114 is movably located in the receiving cavity 113 so that the user can easily rotate the rotation part 111 to adjust the length of the two cables 3.

Figure 9:
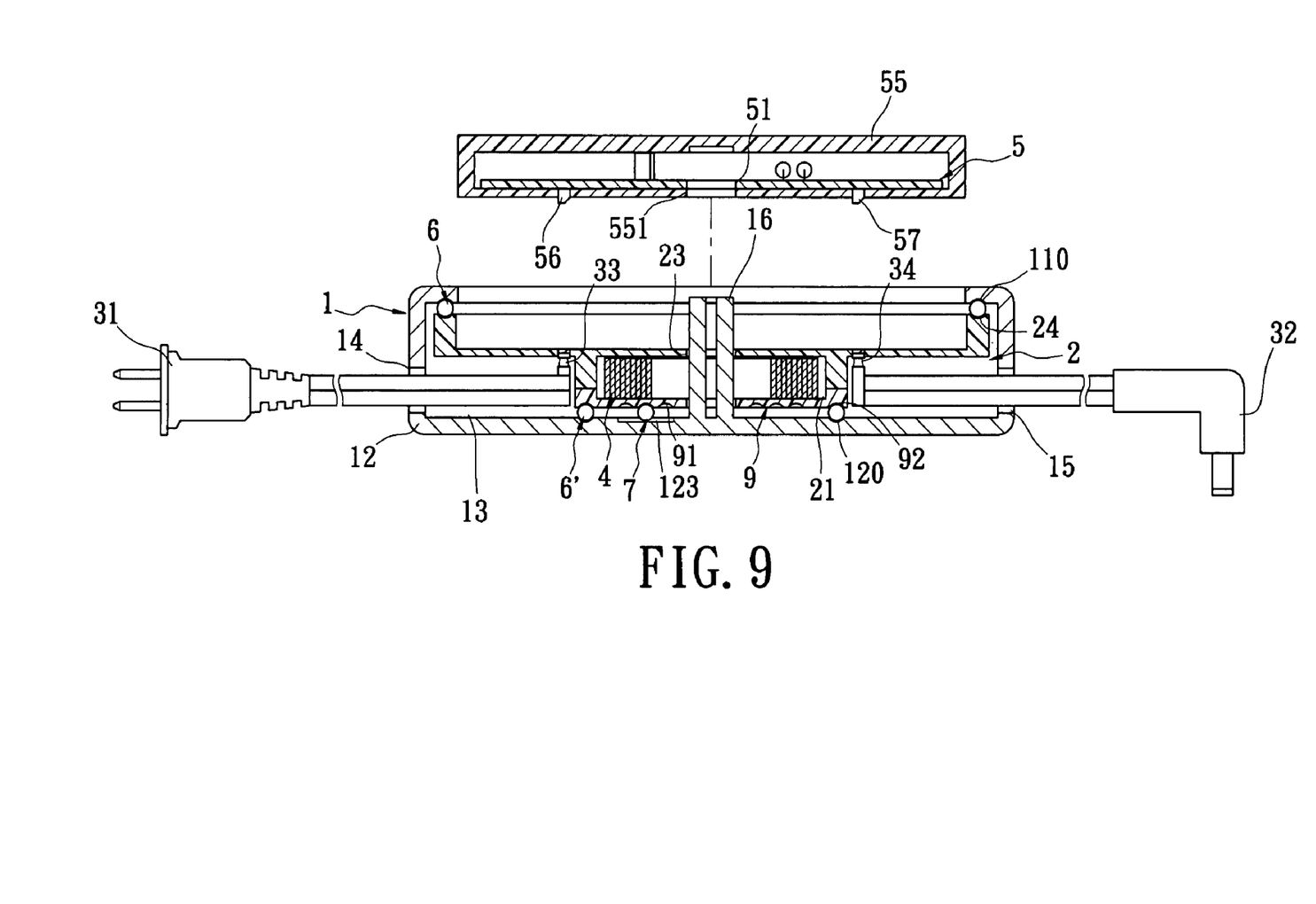
FIG. 9 is a cross-sectional view of the wire-winding device having a circuit unit of the seventh embodiment of the present invention.

Reference is made to FIG. 9, which shows a cross-sectional view of the wire-winding device having a circuit unit of the seventh embodiment of the present invention. The difference between the seventh embodiment and the first embodiment (as shown in FIG. 3) is described as followings. The circuit unit 5 is located in a box 55. The box 55 is circular. The box 55 is located in the second receiving cavity 22 and can be dismounted. The center of the bottom of the box 55 has a hole 551. Through the hole 551, the box 55 is movably fixed with the shaft 16. The bottom of the box 55 has a first joint 56 and a second joint 57. The first joint 56 is electrically connected with the circuit unit 5 and the first connection terminal 33. The second joint 57 is electrically connected with the circuit unit 5 and the second connection terminal 34. Thereby, the wire-winding device can be easily assembled and disassembled.

Figure 10:
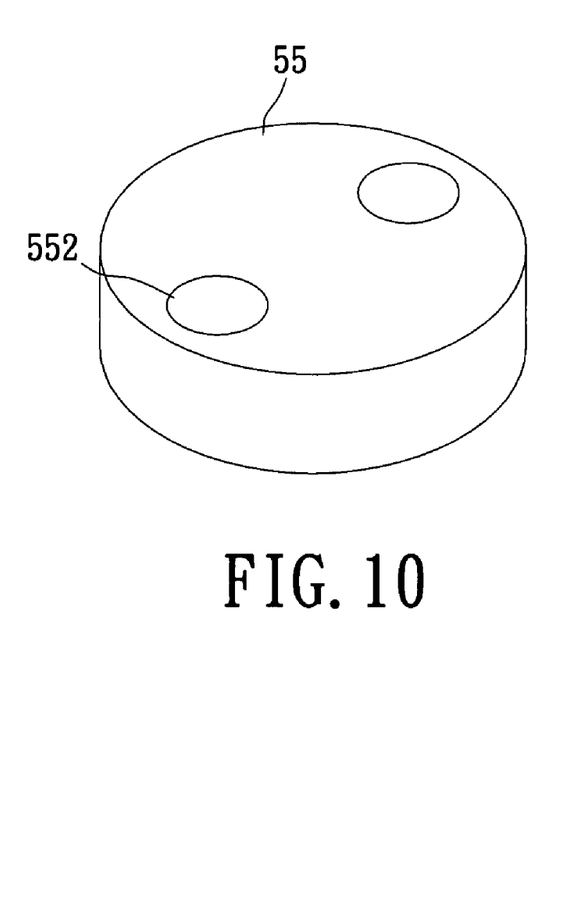
FIG. 10 is a perspective view of the box of the wire-winding device having a circuit unit of the present invention.

Reference is made to FIG. 10, which shows a perspective view of the box of the wire-winding device having a circuit unit of the present invention. The top of the box 55 has two turning slots 552 so that the user can easily wind the cable.

Figure 11:
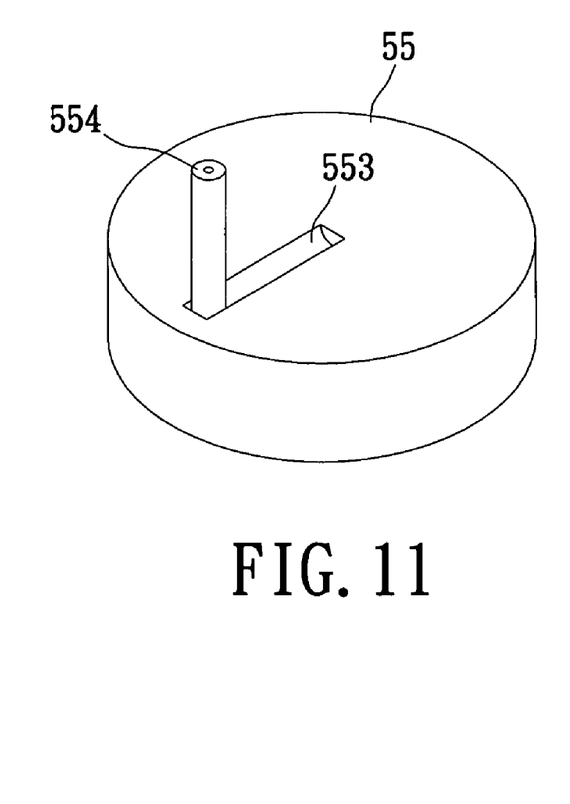
FIG. 11 is another perspective view of the box of the wire-winding device having a circuit unit of the present invention.

Reference is made to FIG. 11, which shows a perspective view of another box of the wire-winding device having a circuit unit of the present invention. The difference of the box 55 between this embodiment with the previous embodiment is described as followings. The bottom of the box 55 has a receiving cavity 553. A turning rod 554 is received in the receiving cavity 553 so that the user can automatically rotate the box 55 to adjust the length of the two cables 3. Furthermore, the first receiving cavity 21 does not have the scroll spring 4 and the wire-winging box is manual.

Figure 12:
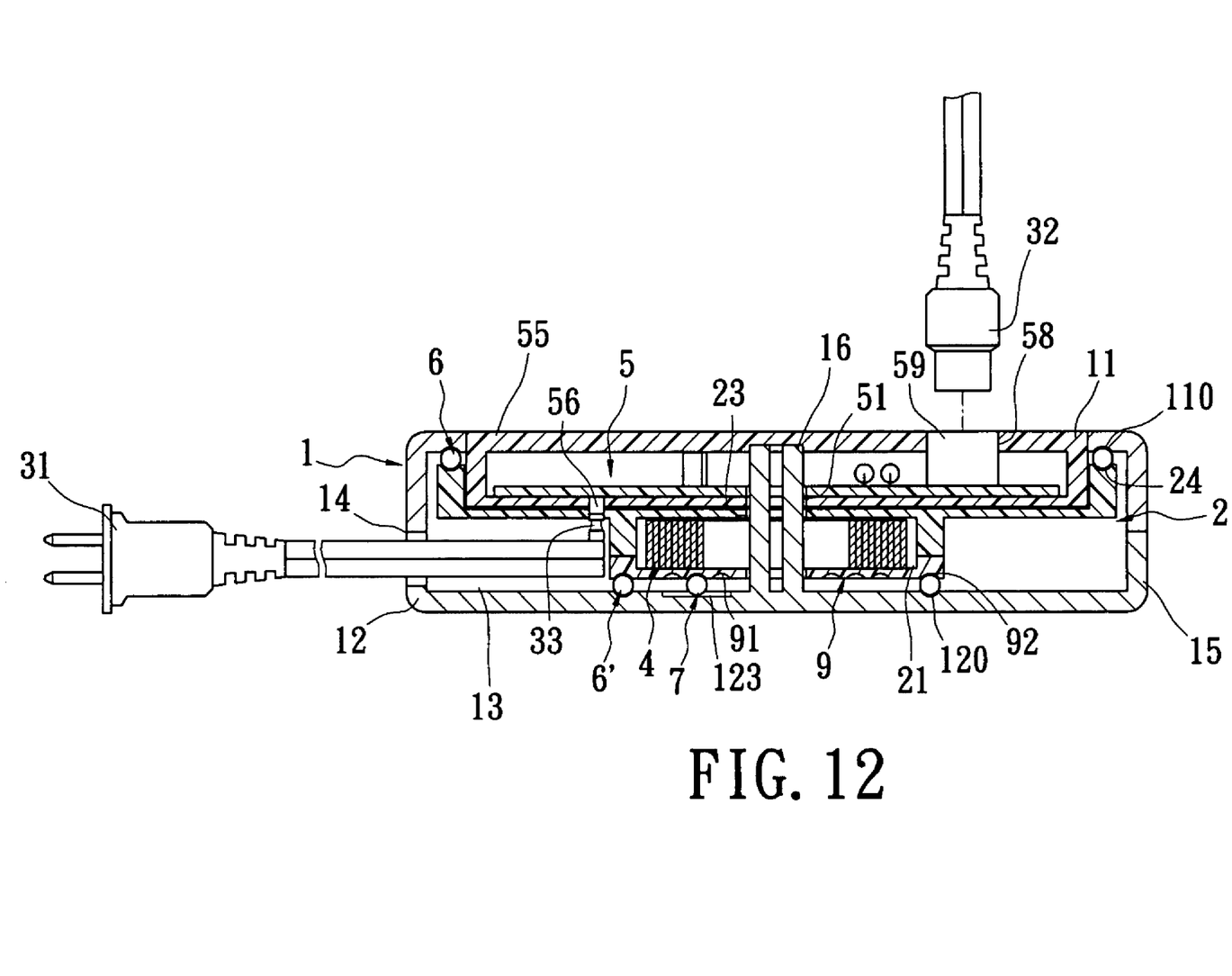
FIG. 12 is a cross-sectional view of the wire-winding device having a circuit unit of the eighth embodiment of the present invention.

Reference is made to FIG. 12, which shows a cross-sectional view of the wire-winding device having a circuit unit of the eighth embodiment of the present invention. The difference between the eighth embodiment and the seventh embodiment (as shown in FIG. 9) is described as followings. The top of the box 55 has a plugging hole 58, and the circuit unit 5 has a socket 59. The plugging hole 58 corresponds to the socket 59. The electric connector 32 is plugged into the socket 59 of the circuit unit 5 via the plugging hole 58 to be a wire-winding device that can received the cable in a single side.

The wire-winding device having a circuit unit of the present invention can replace the heavy rectifying transformer of a laptop or other devices. Therefore, it is convenient for the user to carry the device. The rolling balls 6, 6' are respectively located between the groove 110 and the two concave slots 24, and the groove 120 and the two concave slots 92 to reduce the friction force between both. Thereby, the two cables 3 can be rapidly released or received. Furthermore, by locating the circuit unit 5 in the second receiving cavity 22 of the wire-winding disk 2 to electrically connect the cables 3, the wire-winding device having a circuit unit can convert the voltage or the current inputted from the electrical connector 31 into the desired voltage or current, and output the desired voltage or current to the electrical connector 32.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A wire-winding device having a circuit unit, comprising:
an insulating body having a receiving space, the insulating body having a moving slot and a groove adjacent to the moving slot formed in an inner wall thereof;
a wire-winding disk rotatably located in the receiving space, wherein the wire-winding disk has a first receiving cavity on one side thereof, a second receiving cavity centrally disposed on an opposing side of the wire-winding disk and at least one first concave slot disposed adjacent and external to the second receiving cavity;
at least one first rolling ball disposed at least partially within the first concave slot and contacting the insulating body;
two cables wound around the wire-winding disk;
a scroll spring located in the first receiving cavity, wherein the scroll spring is connected between the wire-winding disk and the insulating body;
a circuit unit located in the second receiving cavity, wherein the circuit unit is electrically connected with the cables for converting an input voltage to a certain output voltage;
a rotatable disk body disposed below the scroll spring, the disk body having a track slot disposed in correspondence with the moving slot and two second concave slots respectively disposed in correspondence with the groove formed in the insulating body;
a second rolling ball received between the track slot and the moving slot; and
two rolling balls respectively received between the two second concave slots and the groove formed in the insulating body.

2. The wire-winding device having a circuit unit as claimed in claim 1, wherein the insulating body comprises a first shell and a second shell, and the first shell and the second shell are assembled together.

3. The wire-winding device having a circuit unit as claimed in claim 1, wherein there is a shaft on an inner wall of the insulating body, the center of the wire-winding disk and the center of the circuit unit respectively have a shaft hole and a first through hole, the shaft passes through the first through hole and the winding disk rotates about the shaft.

4. The wire-winding device having a circuit unit as claimed in claim 1, wherein a side of the insulating body has a first cable hole and a second cable hole, one end of each of the two cables respectively extends to outside of the first cable hole and the second cable hole of the insulating body to connect with a electrical connector, and a second end of each of the two cables respectively has a first connection terminal and a second connection terminal.

5. The wire-winding device having a circuit unit as claimed in claim 4, wherein the circuit unit has two connection portions, and the first connection terminal and the second connection terminal are respectively and electrically connected with the two connection portions.

6. The wire-winding device having a circuit unit as claimed in claim 1, wherein the wire-winding disk has a first rotation body and a second rotation body, the first receiving cavity is located in the first rotation body, the second receiving cavity is located in the second rotation body, and the first rotation body is assembled with the second rotation body.

7. The wire-winding device having a circuit unit as claimed in claim 1, wherein two ends of the scroll spring respectively have a first wedging terminal and a second wedging terminal, and the first wedging terminal and the second wedging terminal respectively are wedged with the wire-winding disk and the insulating body.

8. The wire-winding device having a circuit unit as claimed in claim 1, wherein the circuit unit is a rectifying transformer circuit unit, and a center of the circuit unit has a second through hole.

9. The wire-winding device having a circuit unit as claimed in claim 1, wherein the insulating body is rotatably installed with a rotation part, the rotation part is connected with the wire-winding disk, and the rotation part has at least one turning slot.

10. The wire-winding device having a circuit unit as claimed in claim 1, wherein the insulating body is rotatably installed with a rotation part, the rotation part is connected with the wire-winding disk, and the rotation part is pivoted with a turning rod.

11. The wire-winding device having a circuit unit as claimed in claim 1, wherein the circuit unit has a socket, the circuit unit is located in a box, the box is detachably received in the second receiving cavity, a bottom of the box has a first joint, and the first joint is electrically connected with the circuit unit and the cable, a top of the box has a plugging hole, and the plugging hole corresponds to the socket of the circuit unit.

12. A wire-winding device having a circuit unit, comprising:
   an insulating body having a receiving space;
   a wire-winding disk rotatably located in the receiving space, wherein the wire-winding disk has a first receiving cavity on one side thereof, a second receiving cavity disposed on an opposing side of the wire-winding disk and at least one concave slot disposed adjacent and external to the first receiving cavity;
   two cables wound around the wire-winding disk;
   a scroll spring located in the first receiving cavity, wherein the scroll spring is connected between the wire-winding disk and the insulating body; and
   a circuit unit located in the second receiving cavity, wherein the circuit unit is electrically connected with the cables for converting an input voltage to a certain output voltage, the circuit unit being located in a box, the box being detachably received in the second receiving cavity, a bottom of the box having a first joint and a second joint, the first joint and the second joint being electrically connected with the circuit unit and the two cables, wherein the box has at least one turning slot.

13. A wire-winding device having a circuit unit, comprising:
   an insulating body having a receiving space;
   a wire-winding disk rotatably located in the receiving space, wherein the wire-winding disk has a first receiving cavity on one side thereof, a second receiving cavity disposed on an opposing side of the wire-winding disk and at least one concave slot disposed adjacent and external to the first receiving cavity;
   two cables wound around the wire-winding disk;
   a scroll spring located in the first receiving cavity, wherein the scroll spring is connected between the wire-winding disk and the insulating body; and
   a circuit unit located in the second receiving cavity, wherein the circuit unit is electrically connected with the cables for converting an input voltage to a certain output voltage, the circuit unit being located in a box, the box being detachably received in the second receiving cavity, a bottom of the box having a first joint and a second joint, the first joint and the second joint being electrically connected with the circuit unit and the two cables, wherein the box is pivoted with a turning rod.

* * * * *